United States Patent
Nakanishi et al.

(10) Patent No.: US 8,345,113 B2
(45) Date of Patent: Jan. 1, 2013

(54) IMAGE PROCESSING APPARATUS AND IMAGE PROCESSING SYSTEM

(75) Inventors: Keiri Nakanishi, Kanagawa (JP);
Takashi Miyamori, Kanagawa (JP);
Shunichi Ishiwata, Chiba (JP);
Katsuyuki Kimura, Kanagawa (JP);
Takahisa Wada, Kanagawa (JP);
Masato Sumiyoshi, Tokyo (JP); Yasuki Tanabe, Tokyo (JP); Ryuji Hada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 593 days.

(21) Appl. No.: 12/512,593

(22) Filed: Jul. 30, 2009

(65) Prior Publication Data
US 2010/0103282 A1 Apr. 29, 2010

(30) Foreign Application Priority Data
Oct. 28, 2008 (JP) .................................. 2008-277049

(51) Int. Cl.
*H04N 5/228* (2006.01)
(52) U.S. Cl. .................................. 348/222.1; 348/231.2
(58) Field of Classification Search ............... 348/231.2, 348/222.1; 712/204, 223, 300; 345/531–535, 345/543–544, 547; 711/154–155
See application file for complete search history.

(56) References Cited

U.S. PATENT DOCUMENTS
6,477,643 B1 * 11/2002 Vorbach et al. ............... 713/100

FOREIGN PATENT DOCUMENTS
| JP | 8-147207 | 6/1996 |
| JP | 11-312085 | 11/1999 |
| JP | 2001-24180 | 1/2001 |
| JP | 2005-56238 | 3/2005 |
| JP | 2008-3708 | 1/2008 |
| JP | 2008-146545 | 6/2008 |

OTHER PUBLICATIONS
U.S. Appl. No. 12/876,599, filed Sep. 7, 2010, Tanabe, et al.
U.S. Appl. No. 12/559,962, filed Sep. 15, 2009, Hada, et al.

* cited by examiner

*Primary Examiner* — Yogesh Aggarwal
(74) *Attorney, Agent, or Firm* — Oblon, Spivak, McClelland, Maier & Neustadt, L.L.P.

(57) ABSTRACT

An image processing apparatus has: a data memory configured to store image data; an RP register configured to hold a two-dimensional address indicating a position of an RP in a frame of image data; and an RP control section configured to control the two-dimensional address held by the RP register on the basis of the width and height of the frame. Furthermore, the image processing apparatus has an address calculation unit configured to, when reading target pixel data is read from the data memory on the basis of an instruction code provided with a field for specifying a two-dimensional relative position from the RP by a combination of two immediate values, calculate an address at which the reading target pixel data is stored, on the basis of the two-dimensional address, the combination of immediate values and the width of the frame.

20 Claims, 7 Drawing Sheets

FIG.2

| INSTRUCTION FORMAT | DESCRIPTION OF OPERATION |
|---|---|
| ℓds R0, Ix0, Iy0 | R0 ← Image[RPy+Iy0][RPx+Ix0] |
| ℓdd R0, R1, Ix0, Ix1, Iy0, Iy1 | R0 ← Image[RPy+Iy0][RPx+Ix0]<br>R1 ← Image[RPy+Iy1][RPx+Ix1] |
| ℓdt R0, R1, R2, Ix0, Ix1, Ix2, Iy0, Iy1, Iy2 | R0 ← Image[RPy+Iy0][RPx+Ix0]<br>R1 ← Image[RPy+Iy1][RPx+Ix1]<br>R2 ← Image[RPy+Iy2][RPx+Ix2] |

FIG.4

| INSTRUCTION FORMAT | DESCRIPTION OF OPERATION |
|---|---|
| ℓds R0, Ix0, Iy0, DPRx, DPRy | R0 ← Image[RPy+Iy0+DPRy][RPx+Ix0+DPRx] |
| ℓdd R0, R1, Ix0, Ix1, Iy0, Iy1, DPRx, DPRy | R0 ← Image[RPy+Iy0+DPRy][RPx+Ix0+DPRx]<br>R1 ← Image[RPy+Iy1+DPRy][RPx+Ix1+DPRx] |
| ℓdt R0, R1, R2, Ix0, Ix1, Ix2, Iy0, Iy1, Iy2, DPRx, DPRy | R0 ← Image[RPy+Iy0+DPRy][RPx+Ix0+DPRx]<br>R1 ← Image[RPy+Iy1+DPRy][RPx+Ix1+DPRx]<br>R2 ← Image[RPy+Iy2+DPRy][RPx+Ix2+DPRx] |

IMAGE PROCESSING APPARATUS AND IMAGE PROCESSING SYSTEM

CROSS REFERENCE TO RELATED APPLICATION

This application is based upon and claims the benefit of priority from the prior Japanese Patent Application No. 2008-277049 filed in Japan on Oct. 28, 2008; the entire contents of which are incorporated herein by this reference.

BACKGROUND OF THE INVENTION

1. Field of the Invention

The present invention relates to an image processing apparatus and an image processing system, and in particular to an image processing apparatus and an image processing system provided with a two-dimensional loading instruction in which a two-dimensional relative position is specified in an instruction code as immediate values.

2. Description of Related Art

Conventionally, an image processing apparatus has been proposed which reads data on a memory and writes the data for which predetermined operation processing has been performed to the memory. In the image processing apparatus, it is required to perform address calculation when certain data is specified and loaded, and there is a problem that the number of loadings increases as processing is complicated and the number of cycles required for the address calculation increases.

Therefore, an image processing apparatus is proposed in which, by giving an address on a memory at which data to be loaded is stored to an instruction field and loading the data by one instruction, the necessity of address calculation is eliminated. However, in the image processing apparatus, as the number of pixels to be stored in the memory is larger, the instruction field becomes longer. Furthermore, in the image processing apparatus, when multiple pixels are loaded at the same time, multiple long instruction fields are required, and therefore, there is a problem that the area of the instruction memory increases.

Furthermore, an image processing apparatus is proposed, for example, which transfers data in a predetermined rectangular area to a register in advance without specifying one or two pieces of data required for processing (see, for example, Japanese Patent Application Laid-Open Publication No. 2008-3708).

The proposed image processing apparatus is adapted to, when loading data from a memory, specify "loading starting address", "increment width", "data height" and "data interval" in an loading instruction and transfer data in a predetermined rectangular area to a register. However, all the data in the rectangular area which has been transferred to the register is not necessarily used for operation of image processing. Furthermore, the image processing apparatus requires the registers for storing the data in the predetermined rectangular area, and there is a problem that the necessary number of registers increases as the data in the rectangular area increases.

BRIEF SUMMARY OF THE INVENTION

According to one aspect of the present invention, it is possible to provide an image processing apparatus provided with: a data memory configured to store image data; a first register configured to hold a first two-dimensional address indicating a position of a read pointer in a frame of the image data; a control circuit configured to control the first two-dimensional address held by the first register on the basis of the width of the frame and the height of the frame; a load/store unit configured to read reading target pixel data from the data memory on the basis of an instruction code provided with a field for specifying a two-dimensional relative position from the read pointer by a combination of two immediate values and write pixel data obtained by performing predetermined operation processing for the target pixel data which has been read, into a predetermined area of the data memory; and an address calculation unit configured to, when the load/store unit reads the reading target pixel data from the data memory, calculate an address at which the reading target pixel data is stored, on the basis of the first two-dimensional address, the combination of immediate values and the width of the frame.

BRIEF DESCRIPTION OF THE DRAWINGS

FIG. 2 is a diagram for illustrating an example of an instruction format;

FIG. 4 is a diagram for illustrating an example of an instruction format;

DETAILED DESCRIPTION OF THE INVENTION

Embodiments of the present invention will be described below in detail with reference to drawings.

First Embodiment

Figure 1:
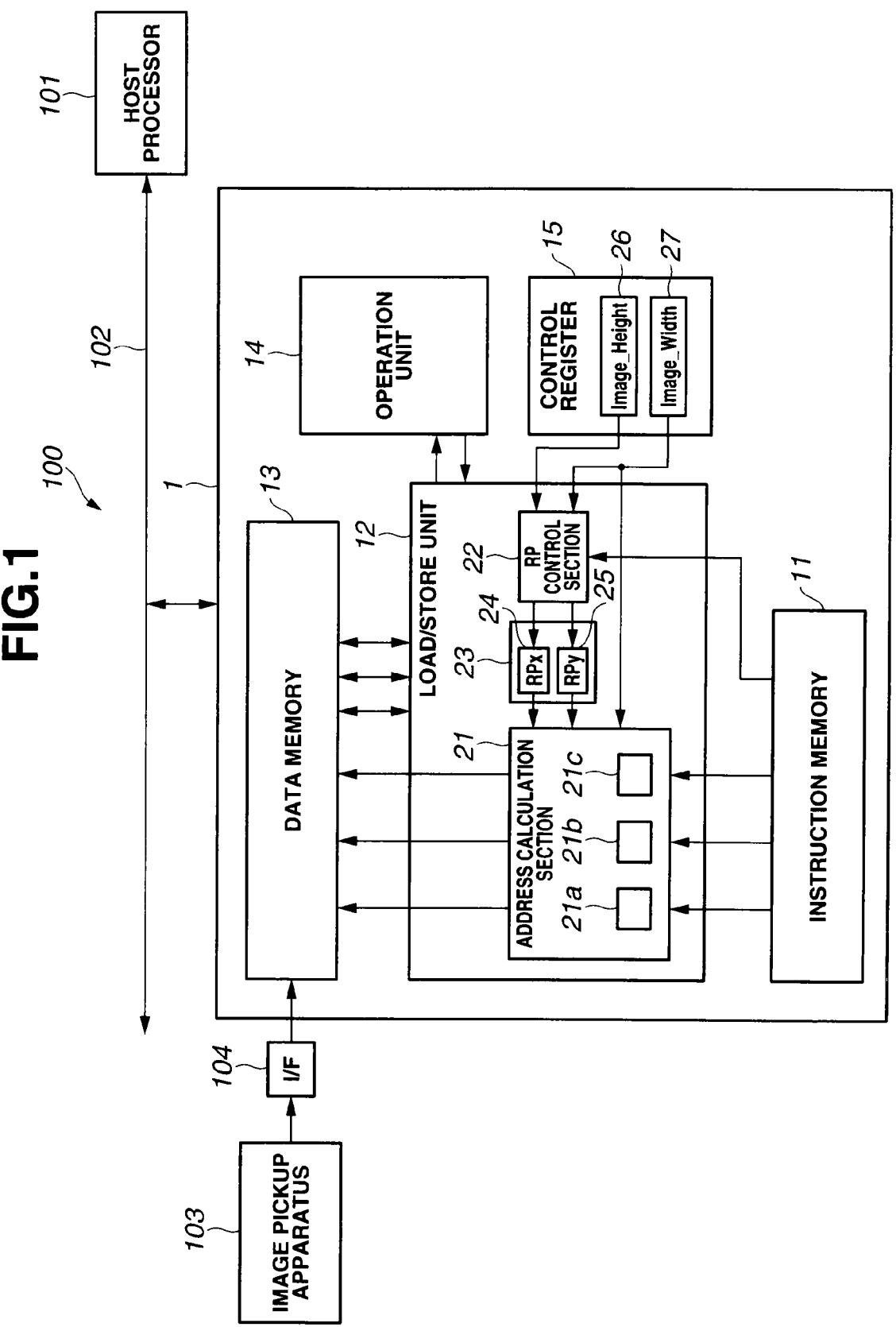
FIG. 1 is a block diagram showing the configuration of an image processing apparatus according to a first embodiment.

First, the configuration of an image processing apparatus according to a first embodiment of the present invention will be described on the basis of FIG. 1. FIG. 1 is a block diagram showing the configuration of the image processing apparatus according to the first embodiment.

As shown in FIG. 1, an image processing apparatus 1 is configured to have an instruction memory 11, a load/store unit 12, a data memory 13, an operation unit 14 and a control register 15 and configured as one chip.

An image processing system 100 is configured to have a host processor 101, a bus 102, an image pickup apparatus 103 and an interface (hereinafter referred to as an I/F) 104 outside the image processing apparatus 1. The image processing apparatus 1, the host processor 101, the bus 102, the image pickup apparatus 103 and the I/F 104 may be configured as one chip. The image processing apparatus 1 is used, for example, for image processing of a mobile phone, a digital camera and the like.

The host processor 101 performs writing of a predetermined instruction code to the instruction memory 11 via the bus 102. The host processor 101 performs writing of predetermined data to the control register 15.

The image pickup apparatus 103 is, for example, a CMOS sensor or the like, and performs writing of image data of a captured image to the data memory 13 via the I/F 104.

The load/store unit 12 reads image data from the data memory 13 on the basis of an instruction code from the instruction memory 11 and outputs the read image data to the operation unit 14.

The operation unit 14 performs operation processing by firmware, for example, RGB interpolation processing from a Bayer array, filter processing such as LPF and HPF processing, and gamma correction processing for the inputted image data and outputs the image data to the load/store unit 12.

The load/store unit 12 writes the image data for which predetermined operation processing has been performed, to the data memory 13.

The result of the operation performed by the operation unit 14, that is, the final image data stored in the data memory 13 is outputted to the host processor 101 via the bus 102 or stored in a register or memory not shown which exists outside the image processing apparatus 1.

The load/store unit 12 is configured to have an address calculation section 21, an RP control section 22 which controls a read pointer (hereinafter referred to as an RP) which indicates the position of a processing target pixel in a frame, and an RP register 23 having an RPx 24 and an RPy 25 holding the two-dimensional address of the RP.

The address calculation section 21 configured by hardware is configured to have multiple (here, three) address calculation units 21a, 21b and 21c. As described above, the address calculation section 21 has three address calculation units 21a, 21b and 21c and can load three pixels at the same time. Therefore, the data memory 13 is divided in at least three banks in order to load three pixels at the same time.

Though the address calculation section 21 has three address calculation units 21a, 21b and 21c, the address calculation section 21 may have one, two, four or more address calculation units. For example, in the case of having four address calculation units, it is possible to load four pixels at the same time if the data memory 13 is divided in at least four banks.

The control register 15 is configured to have a register 26 configured to store the height of a frame (Image_Height) and a register 27 configured to store the width of the frame (Image_Width). In the register 26, a value which indicates the longitudinal direction height of a frame, that is, the vertical direction height of the frame is stored by the host processor 101. Similarly, in the register 27, a value which indicates the lateral direction width of the frame, that is, the horizontal direction width of the frame is stored by the host processor 101. Each of the values stored in the registers 26 and 27 is provided for the RP control section 22 and used for control of the RP to be described later. The value stored in the register 27 is provided for each of the address calculation units 21a, 21b and 21c of the address calculation section 21 configured by hardware and used for address calculation to be described alter.

Here, a method for updating the RP will be described. The position of a pixel of the RP in a frame is indicated by a pixel [i][j]. The longitudinal direction position of the frame is denoted by i, which is an integer between and including 0 and m. The lateral direction position of the frame is denoted by j, which is an integer between and including 0 and n. The RP is assumed to be moved so as to point at each of the pixels in the frame, beginning with the pixel at the upper left of the frame, in the order of raster scanning.

In the initial state, the RP is pointing at a pixel [0][0] which is to be processed first in the frame. The address at which the pixel [0][0] is stored in the data memory 13 is initially set to the RPx 24 and the RPy 25 which are registers in the load/store unit 12. When the above-described operation processing by the firmware ends, the RP control section 22 updates the RP by incrementing the pixel [0][0] to a pixel [0][1]. In this way, the RP control section 22 updates the RP every time the series of operation processes by the firmware ends, and the RP control section 22 updates the RP until an pixel [m][n] is reached in the end. The RP control section 22 judges whether or not the series of operation processes by the firmware has ended, on the basis of a control signal from the instruction memory 11.

Furthermore, the RP control section 22 performs judgment about whether processing for one line has ended and judgment about whether processing for one frame has ended, on the basis of the frame height stored in the register 26 and the frame width stored in the register 27. For example, when the width of the frame is denoted by Width, and the height of the frame is denoted by Height, the RP control section 22 judges that processing for one line has ended when the RP comes to a pixel [0][Width-1], wraps around, and updates the address to the address of a pixel [1][0]. When the RP comes to the address of a pixel [Height-1][Width-1], the RP control section 22 judges that processing corresponding to one frame has ended, wraps around, and updates the address. The position of the RP in the frame and the memory address at which the RP is stored are stored in the RP register 23 in the load/store unit 12 and management of initialization, update and the like is performed.

The RP control section 22 controls the RP on the basis of the frame width stored in the register 27 and the frame height stored in the register 26. However, the RP control section 22 may control the RP on the basis of a horizontal synchronization signal and a vertical synchronization signal provided from the image pickup apparatus 103.

Next, description will be made on a two-dimensional loading instruction in the case of reading a pixel [i+Imm_y][j+Imm_x] when the RP is pointing at the pixel [i][j]. FIG. 2 is a diagram for illustrating an example of an instruction format. Here, each of Imm_x and Imm_y indicates a horizontal direction relative position and a vertical direction relative position of an pixel to be loaded, from the RP. For example, (Imm_x, Imm_y) is (Ix0, Iy0), (Ix1, Iy1) or (Ix2, Iy2) as described later.

As shown in FIG. 2, the two-dimensional relative position from the RP is specified in an instruction field by a pair of two immediate values for a pixel. In the case of a one pixel loading instruction, a two-dimensional relative position (Ix0, Iy0) corresponding to one pixel is given in the immediate value field in the instruction. Similarly, in the case of a two pixel loading instruction, two-dimensional relative positions (Ix0, Iy0) and (Ix1, Iy1) corresponding to two pixels are given in the immediate value field in the instruction, and, in the case of a three pixel loading instruction, two-dimensional relative positions (Ix0, Iy0), (Ix1, Iy1) and (Ix2, Iy2) corresponding to three pixels are given in the immediate value field in the instruction. Receiving such an instruction code, the address calculation unit 21a calculates a reading target address by the following expression:

$$\text{Target address}=(RPy+Iy0)\times\text{Image\_Width}+(RPx+Ix0)$$

The address calculation unit 21b changes Iy0 and Ix0 in the above expression to Iy1 and Ix1, respectively, and performs calculation. The address calculation unit 21c changes Iy0 and Ix0 in the above expression to Iy2 and Ix2, respectively, and performs calculation.

Each of the address calculation units 21a, 21b and 21c outputs a target address obtained from the address calculation described above to the data memory 13. Thereby, three pixels corresponding to the target addresses are loaded at the same time.

In the case of loading data corresponding to one pixel on the basis of the RP, the address calculation unit 21a performs the address calculation described above and outputs a corresponding target address to the data memory 13, and each of the address calculation units 21b and 21c outputs a signal indicating invalidity to the data memory 13. Similarly, in the case of loading data corresponding to two pixels on the basis of the RP at the same time, each of the address calculation units 21a and 21b performs the address calculation described above and outputs a corresponding target address to the data memory 13, and the address calculation unit 21c outputs a signal indicating invalidity to the data memory 13.

As described above, the image processing apparatus 1 holds an instruction set in which a two-dimensional relative position of a pixel to be loaded, from the RP which is a processing target pixel, is given in the immediate value field of an instruction, in the instruction memory 11. Furthermore, the image processing apparatus 1 is adapted to determine a target address from a predetermined address calculation expression on the basis of the RP which is a processing target pixel, immediate values and frame width. As a result, address calculation by firmware is unnecessary, and the number of cycles required for the address calculation is reduced.

Furthermore, in the case of specifying pixels corresponding to nine lines with an image width of 3000 pixels, a long instruction field is required if an address on the memory is given in an instruction field without using a two-dimensional address. That is, in the case of specifying an address by one instruction to load data, 3000×9=27000, that is, a 15-bit instruction field is required. In the case of loading three pixels at the same time, a 45-bit instruction field is required. However, the pixels to be loaded from the memory when a pixel pointed at by the RP is being processed as a target is 9×9=81 pixels around the RP at the most. Therefore, in the case of specifying three pixel within the range of 9×9 using the method for a two-dimensional address of the present embodiment, it is sufficient if an instruction field of 4 bits×2×3 pixels=24 bits is held. In comparison with 45 bits, the number of bits can be drastically reduced. In this example, the number of bits is reduced to 21 bits. As a result, a long instruction field is not required, and the area of the instruction memory can be reduced. Furthermore, since it is possible to specify and load only pixels which are necessary for operation, the number of registers can be reduced.

Thus, according to the image processing apparatus of the present embodiment, address calculation is not required, and therefore, it is possible to reduce the area of an instruction memory and reduce the number of registers.

Furthermore, in the case of a firmware developer writing firmware for two-dimensional data reading processing in assembly language, he/she can easily perform writing in assembly language only by thinking about an intuitive two-dimensional logical address because he/she does not have to write address calculation in the firmware. As a result, the firmware developer can write the firmware with few bugs in assembly language, and an advantage is obtained that the development efficiency of the firmware is enhanced.

Second Embodiment

Figure 3:
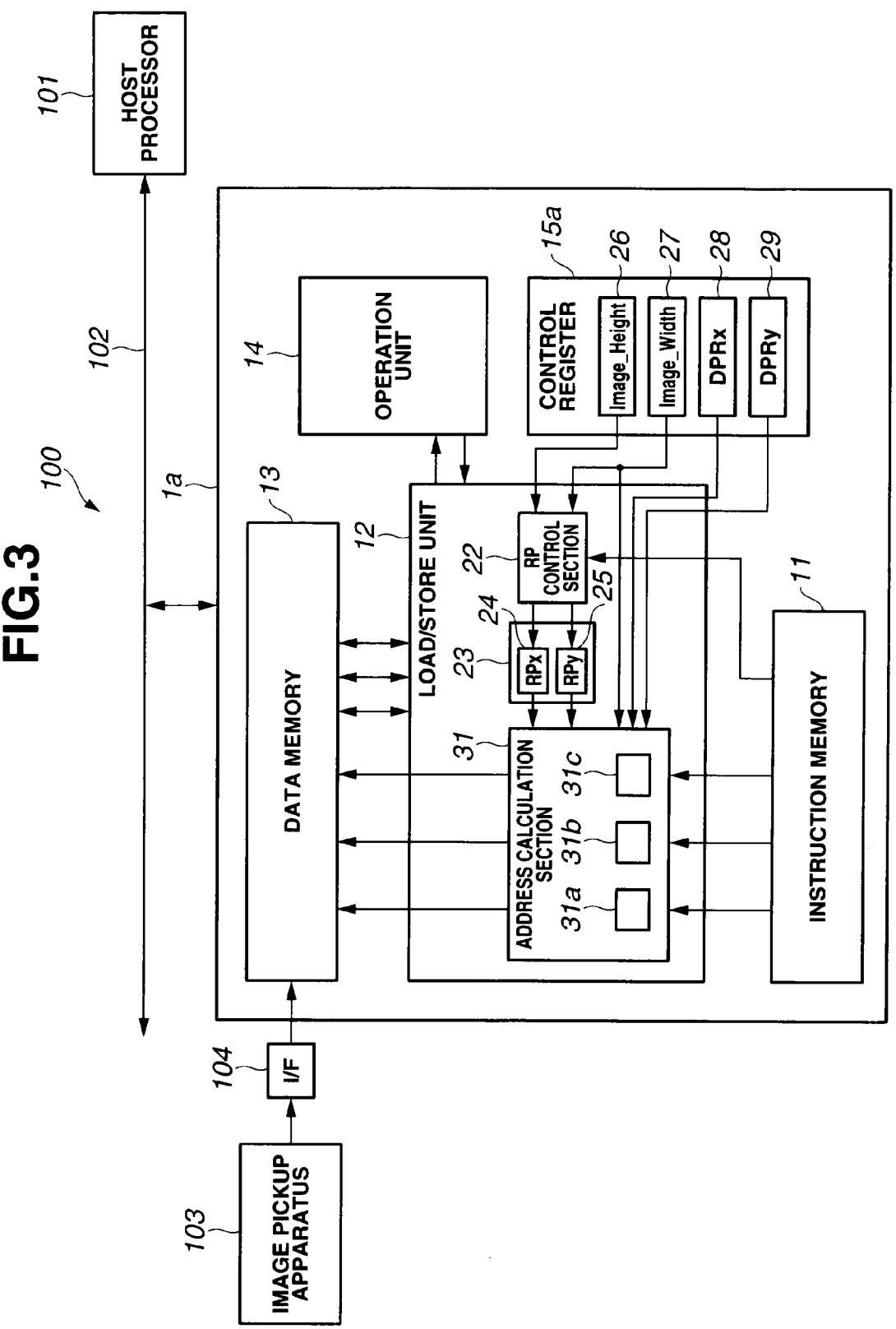
FIG. 3 is a block diagram showing the configuration of an image processing apparatus according to a second embodiment.

First, the configuration of an image processing apparatus according to a second embodiment of the present invention will be described on the basis of FIG. 3. FIG. 3 is a block diagram showing the configuration of the image processing apparatus according to the second embodiment. In FIG. 3, the same components as those in FIG. 1 are given the same reference numerals, and description thereof will be omitted.

An image processing apparatus 1a of the present embodiment specifies a displacement register number in an instruction code in addition to immediate values in the instruction code so that the position of the RP can be virtually moved.

As shown in FIG. 3, the image processing apparatus 1a is configured with the use of an address calculation section 31 instead of the address calculation section 21 in FIG. 1 and a control register 15a instead of the control register 15.

The control register 15a is configured to have registers 28 and 29 configured to store values (DPRx and DPRy) indicating displacement, that is, a two-dimensional relative position from the RP. The registers 28 and 29 constitute a register which holds a two-dimensional address for virtually moving the RP. The address calculation section 31 is configured to have address calculation units 31a, 31b and 31c.

A value (DPRx) indicating horizontal direction displacement is stored into the register 28 by the host processor 101. Similarly, a value (DPRy) indicating vertical direction displacement is stored into the register 29 by the host processor 101. The values indicating the horizontal direction and vertical direction displacements which are stored in the registers 28 and 29, respectively, are provided for the address calculation section 31. It is assumed that one combination of the registers 28 and 29 is provided for simplification of description. However, there may be multiple combinations.

FIG. 4 is a diagram for illustrating an example of an instruction format. As shown in FIG. 4, the instruction format is the instruction format in FIG. 2 in which the register numbers of the registers 28 and 29 are additionally specified in the instruction code. Receiving such an instruction code, the address calculation unit 31a calculates a reading target address by the following expression:

$$\text{Target address} = (RPy + Iy0 + DPRy) \times \text{Image\_Width} + (RPx + Ix0 + DPRx)$$

The address calculation unit 31b changes Iy0 and Ix0 in the above expression to Iy1 and Ix1, respectively, to perform calculation, and the address calculation unit 31c changes Iy0 and Ix0 in the above expression to Iy2 and Ix2, respectively, to perform calculation.

Figure 5:
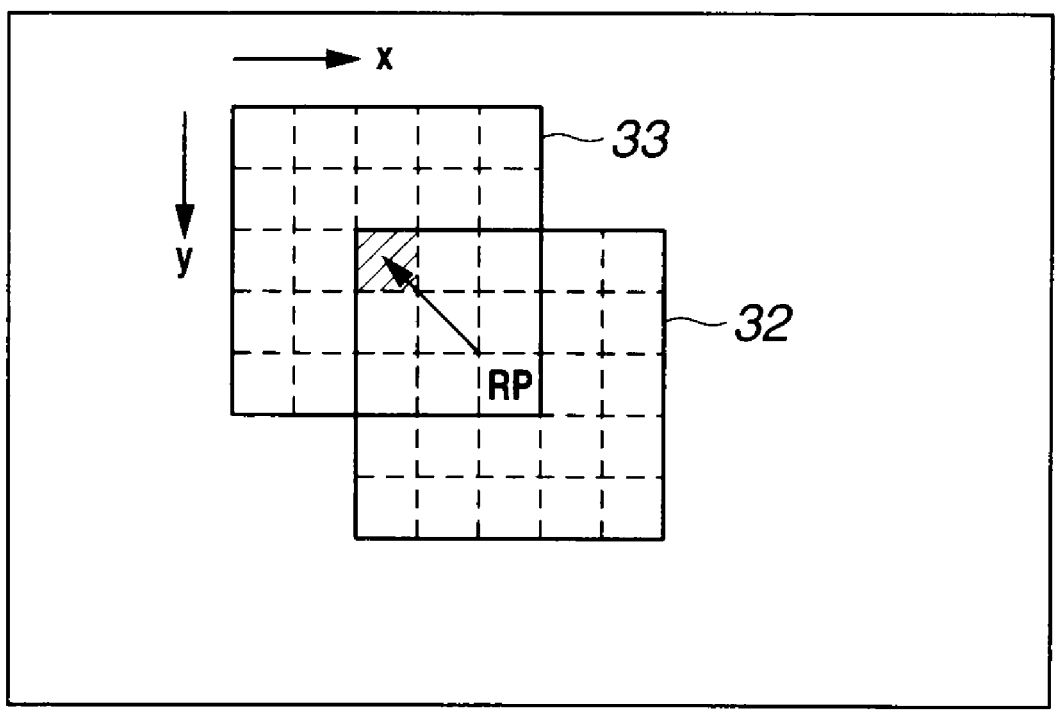
FIG. 5 is a diagram for illustrating an example of virtually moving an RP.

FIG. 5 is a diagram for illustrating an example of virtually moving the RP. As shown in FIG. 5, the load/store unit 12 is assumed to be able to access pixels existing in a rectangular area 32 of 5 pixels×5 pixels based on the RP. By storing −2 in the register 28 and −2 in the register 29, the RP can be moved by −2 in the horizontal direction and by −2 in the vertical direction. By virtually moving the RP in this way, the load/store unit 12 can access a rectangular area 33 of 5 pixels×5 pixels based on the virtually moved RP.

For example, when the data memory 13 is implemented by a line memory, the RP may be returned to perform image processing, as shown in FIG. 5. In this case, if attempting to control the RP by the method described in the first embodiment, the control of the RP is complicated, and, in addition, pixels which cannot be accessed occur inside the rectangular area 33 in FIG. 5 because of restriction of the bit width of the immediate value field for specifying a two-dimensional position. Accordingly, by storing a two-dimensional address for virtually moving the RP into the registers 28 and 29 and specifying register numbers for specifying the registers 28 and 29 in an instruction code, it is possible not only to virtually move the RP but also to access all the pixels in the rectangular area 33 in FIG. 5.

As described above, the image processing apparatus 1a is adapted to be provided with an instruction set in which, in addition to immediate values, the register numbers of registers in which displacement is stored are specified in an instruction field. Each of the address calculation units 31a, 31b and 31c is adapted to perform target address calculation on the basis of a two-dimensional address, immediate values, frame width, and two-dimensional address indicating displacement. As a result, it is possible to load pixel data in a rectangular area obtained by virtually moving the RP.

Thus, according to the image processing apparatus of the present embodiment, an advantage is obtained that it is possible to load the pixels in the rectangular area 33 which could not be accessed because of restriction of the bit width of the instruction field in the case where the data memory 13 is implemented as a line memory and delay occurs, similarly to the case where delay does not occur.

Third Embodiment

Figure 6:
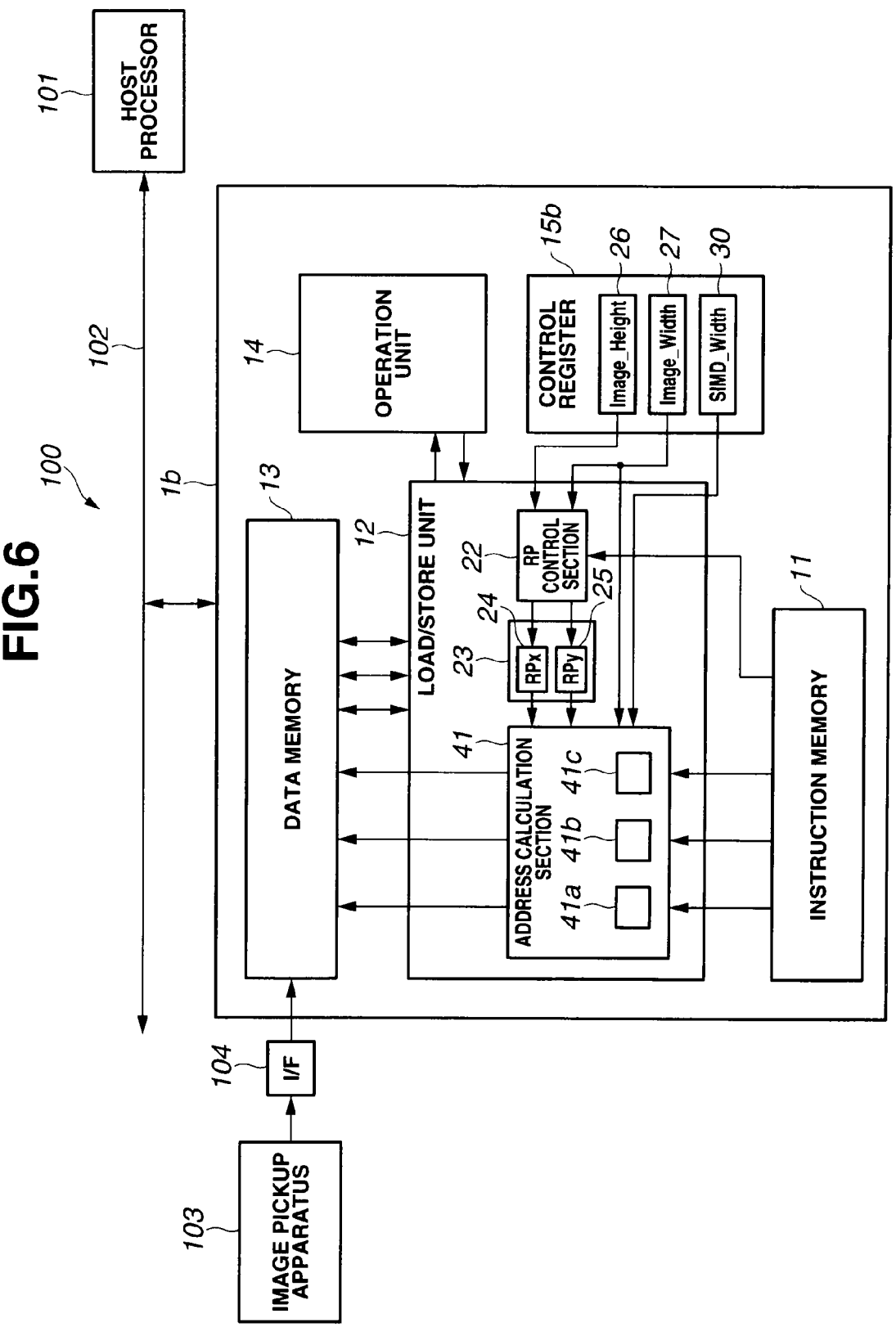
FIG. 6 is a block diagram showing the configuration of an image processing apparatus according to a third embodiment.

Next, the configuration of an image processing apparatus according to a third embodiment of the present invention will be described on the basis of FIG. 6. FIG. 6 is a block diagram showing the configuration of the image processing apparatus according to the third embodiment. In FIG. 6, the same components as those in FIG. 1 are given the same reference numerals, and description thereof will be omitted.

An image processing apparatus 1b of the present embodiment is an example of changing the image processing apparatus 1 in the first embodiment to an SIMD (Single Instruction Multiple Data) type. As shown in FIG. 6, the image processing apparatus 1b is configured with the use of an address calculation section 41 instead of the address calculation section 21 in FIG. 1 and a control register 15b instead of the control register 15.

The control register 15b is configured to have a register 30 in which the value of SIMD width (SIMD_Width) is stored. The address calculation section 41 is configured to have address calculation unit 41a, 41b and 41c.

The value indicating SIMD width is stored into the register 30 by the host processor 101. The SIMD width stored in the register 30 is provided for each of the address calculation units 41a, 41b and 41c of the address calculation section 41.

The address calculation unit 41a calculates a reading target address by the following expression on the basis of the instruction format shown in FIG. 2:

$$\text{Target address} = (RPy + Iy0) \times \text{Image\_Width} + (RPx \times \text{SIMD\_Width} + Ix0)$$

Here, the value of RPx is counted on the assumption that the value of RPx is displaced by 1 each time displacement corresponding to one piece of SIMD data occurs. For example, RPx is specified so that, in the case where the SIMD width is 16, RPx is displaced by 1 when displacement corresponding to sixteen pixels toward the right occurs.

The address calculation unit 41b changes Iy0 and Ix0 in the above expression to Iy1 and Ix1, respectively, to perform calculation, and the address calculation unit 41c changes Iy0 and Ix0 in the above expression to Iy2 and Ix2, respectively, to perform calculation.

As described above, the image processing apparatus 1b is adapted to perform target address calculation on the basis of the SIMD width stored in the register 30 of the control register 15b. The instruction format is an instruction format similar to that in FIG. 2. Therefore, information about the SIMD width is not required to be in the instruction code of a two-dimensional reading instruction. As a result, even if the SIMD width is changed, it is not necessary to change the instruction code.

That is, if the SIMD width is changed, each of the address calculation units 41a, 41b and 41c calculates a target address only by writing the changed SIMD width to the register 30 from the host processor 101.

Therefore, according to the image processing apparatus of the present embodiment, not only an advantage similar to that of the first embodiment but also an advantage that, even if the SIMD width is changed, the instruction code is binary-compatible is obtained, and the firmware can be easily utilized as assets.

Fourth Embodiment

Figure 7:
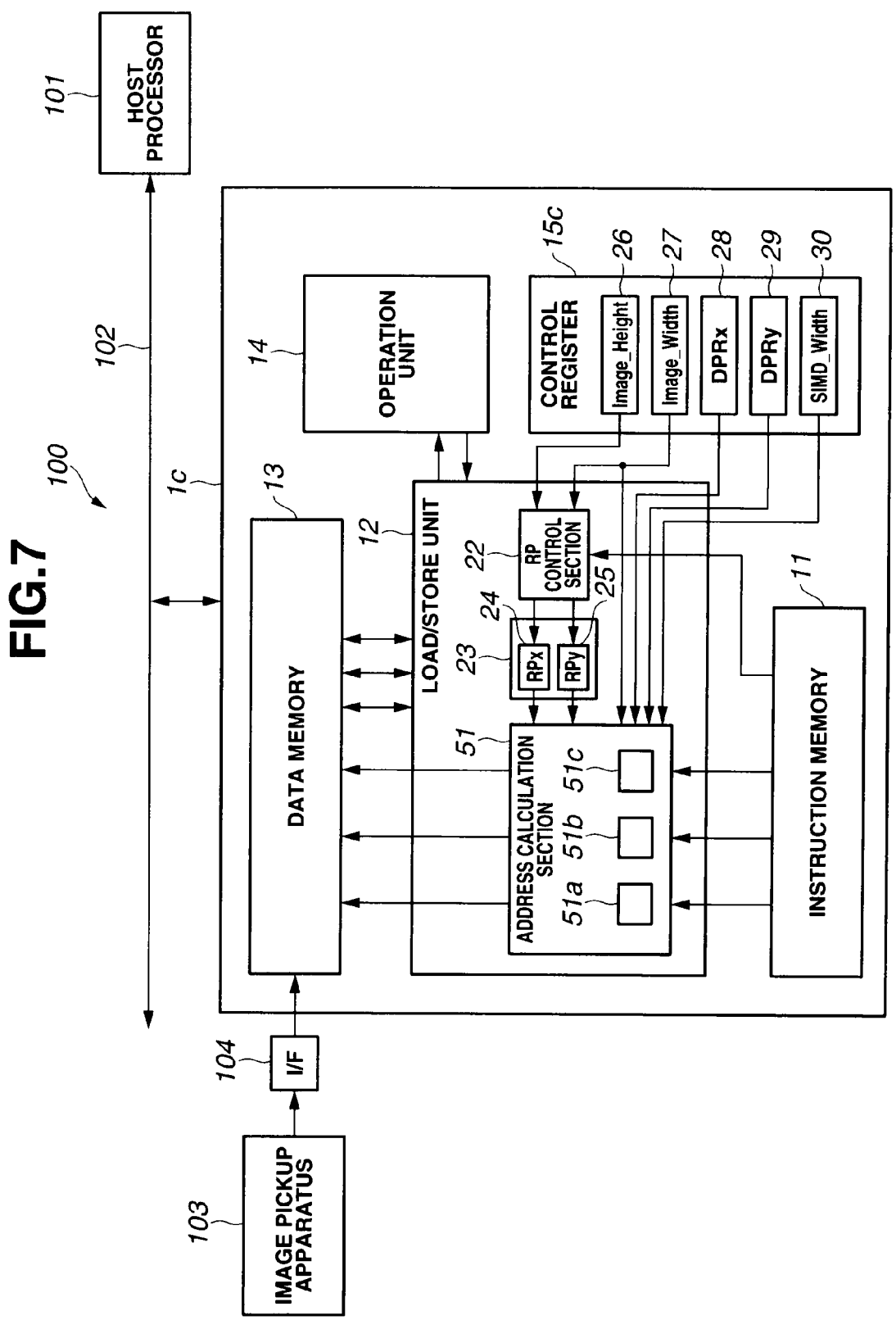
FIG. 7 is a block diagram showing the configuration of an image processing apparatus according to a fourth embodiment.

Next, the configuration of an image processing apparatus according to a fourth embodiment of the present invention will be described on the basis of FIG. 7. FIG. 7 is a block diagram showing the configuration of the image processing apparatus according to the fourth embodiment. In FIG. 7, the same components as those in FIG. 3 are given the same reference numerals, and description thereof will be omitted.

An image processing apparatus 1c of the present embodiment is an example of changing the image processing apparatus 1a in the second embodiment to an SIMD type. As shown in FIG. 7, the image processing apparatus 1c is configured with the use of an address calculation section 51 instead of the address calculation section 31 in FIG. 3 and a control register 15c instead of the control register 15a.

The control register 15c is configured to have the register 30 in which a value indicating the SIMD width (SIMD_Width) is stored. The address calculation section 51 is configured to have address calculation units 51a, 51b and 51c.

The value indicating the SIMD width is stored into the register 30 by the host processor 101. The SIMD width stored in the register 30 is provided for the address calculation section 51.

The address calculation unit 51a calculates a reading target address by the following expression on the basis of the instruction format in FIG. 4:

$$\text{Target address} = (RPy + Iy0 + DPRy) \times \text{Image\_Width} + \{(RPx + DPRx) \times \text{SIMD\_Width} + Ix0\}$$

Here, each of the values of RPx and DPRx is counted on the assumption that the value is displaced by 1 each time displacement corresponding to one piece of SIMD data occurs. For example, RPx and DPRx are specified so that, in the case where the SIMD width is 16, each of RPx and DPRx is displaced by 1 when displacement corresponding to sixteen pixels toward the right occurs.

The address calculation unit 51b changes Iy0 and Ix0 in the above expression to Iy1 and Ix1, respectively, to perform calculation, and the address calculation unit 51c changes Iy0 and Ix0 in the above expression to Iy2 and Ix2, respectively, to perform calculation.

As described above, the image processing apparatus 1c is adapted to perform target address calculation on the basis of the SIMD width stored in the register 30 of the control register 15c. The instruction format is an instruction format similar to that in FIG. 4. Therefore, information about the SIMD width is not required to be in the instruction code of a two-dimensional reading instruction. As a result, even if the SIMD width is changed, it is not necessary to change the instruction code.

That is, if the SIMD width is changed, each of the address calculation units 51a, 51b and 51c calculates a target address only by writing the changed SIMD width to the register 30 from the host processor 101.

Therefore, according to the image processing apparatus of the present embodiment, not only an advantage similar to that of the first embodiment but also an advantage that the instruction code is binary-compatible without depending on the SIMD width is obtained, and the firmware can be easily utilized as assets.

The present invention is not limited to the embodiments described above, and various modifications, alterations and the like can be made within a range not departing from the spirit of the present invention.

What is claimed is:

1. An image processing apparatus comprising:
   a data memory configured to store image data;
   a first register configured to hold a first two-dimensional address indicating a position of a read pointer in a frame of the image data;
   a control circuit configured to control the first two-dimensional address held by the first register on the basis of a width of the frame and a height of the frame;
   a load/store unit configured to read reading target pixel data from the data memory on the basis of an instruction code provided with a field for specifying a two-dimensional relative position from the read pointer by a combination of two immediate values and write pixel data obtained by performing predetermined operation processing for the target pixel data which has been read, into a predetermined area of the data memory; and
   an address calculation unit configured to, when the load/store unit reads the reading target pixel data from the data memory, calculate an address at which the reading target pixel data is stored, on the basis of the first two-dimensional address, the combination of immediate values and the width of the frame.

2. The image processing apparatus according to claim 1, comprising a second register configured to hold a second two-dimensional address for virtually moving the read pointer; wherein
   the instruction code is provided with a field for specifying a register number of the second register in addition to the combination of immediate values; and
   the address calculation unit calculates the address at which the reading target pixel data is stored, on the basis of the first two-dimensional address, the combination of immediate values, the width of the frame and the second two-dimensional address.

3. The image processing apparatus according to claim 1, wherein
   the image processing apparatus is a single instruction, multiple data type image processing apparatus, comprising a register configured to hold a single instruction, multiple data width at the time of performing operation processing; wherein
   the address calculation unit calculates the address at which the reading target pixel data is stored, on the basis of the first two-dimensional address, the combination of immediate values, the width of the frame and the single instruction, multiple data width.

4. The image processing apparatus according to claim 2, wherein
   the image processing apparatus is a single instruction, multiple data type image processing apparatus, comprising a register configured to hold a single instruction, multiple data width at the time of performing operation processing; wherein
   the address calculation unit calculates the address at which the reading target pixel data is stored, on the basis of the first two-dimensional address, the combination of immediate values, the width of the frame, the second two-dimensional address and the single instruction, multiple data width.

5. The image processing apparatus according to claim 1, wherein the control circuit controls the first two-dimensional address held by the first register on the basis of a horizontal synchronization signal and a vertical synchronization signal instead of the width of the frame and the height of the frame, respectively.

6. The image processing apparatus according to claim 1, comprising a plurality of the address calculation units, wherein
   the instruction code is provided with a field for storing a plurality of the combinations of immediate values; and
   each of the plurality of address calculation units calculates an address at which reading target pixel data is stored on the basis of any of the plurality of combinations of immediate values.

7. The image processing apparatus according to claim 6, wherein the load/store unit reads a plurality of pieces of reading target pixel data at the same time on the basis of a plurality of the addresses calculated by the plurality of address calculation units.

8. The image processing apparatus according to claim 1, wherein the control circuit controls the first two-dimensional address by moving the position of the read pointer in the order of raster scanning.

9. The image processing apparatus according to claim 1, comprising a register configured to hold the width of the frame and the height of the frame.

10. The image processing apparatus according to claim 1, comprising an operation unit configured to perform predetermined operation processing for the target pixel data which has been read.

11. The image processing apparatus according to claim 10, wherein the predetermined operation processing performed by the operation unit is any processing performed for the image data.

12. An image processing system comprising:
    an image pickup apparatus configured to obtain image data of a captured image;
    a data memory configured to store the image data;
    a first register configured to hold a first two-dimensional address indicating a position of a read pointer in a frame of the image data;
    a control circuit configured to control the first two-dimensional address held by the first register on the basis of a width of the frame and a height of the frame;
    a load/store unit configured to read reading target pixel data from the data memory on the basis of an instruction code provided with a field for specifying a two-dimensional relative position from the read pointer by a combination of two immediate values and write pixel data obtained by performing predetermined operation processing for the target pixel data which has been read, into a predetermined area of the data memory; and
    an address calculation unit configured to, when the load/store unit reads the reading target pixel data from the data memory, calculate an address at which the reading target pixel data is stored, on the basis of the first two-dimensional address, the combination of immediate values and the width of the frame.

13. The image processing system according to claim 12, comprising a second register configured to hold a second two-dimensional address for virtually moving the read pointer; wherein the instruction code is provided with a field for specifying a register number of the second register in addition to the combination of immediate values; and the address calculation unit calculates the address at which the reading target pixel data is stored, on the basis of the first two-dimensional address, the combination of immediate values, the width of the frame and the second two-dimensional address.

14. The image processing system according to claim 12, wherein the image processing apparatus is a single instruction, multiple data type image processing apparatus, comprising a register configured to hold a single instruction, multiple data width at the time of performing operation processing; wherein the address calculation unit calculates the address at which the reading target pixel data is stored, on the basis of the first two-dimensional address, the combination of immediate values, the width of the frame and the single instruction, multiple data width.

15. The image processing system according to claim 13, wherein the image processing apparatus is a single instruction, multiple data type image processing apparatus, comprising a register configured to hold a single instruction, multiple data width at the time of performing operation processing; wherein the address calculation unit calculates the address at which the reading target pixel data is stored, on the basis of the first two-dimensional address, the combination of immediate values, the width of the frame, the second two-dimensional address and the single instruction, multiple data width.

16. The image processing system according to claim 12, wherein the control circuit controls the first two-dimensional address held by the first register on the basis of a horizontal synchronization signal and a vertical synchronization signal provided from the image pickup apparatus instead of the width of the frame and the height of the frame, respectively.

17. The image processing system according to claim 12, comprising a plurality of the address calculation units; wherein the instruction code is provided with a field for storing a plurality of the combinations of immediate values; and each of the plurality of address calculation units calculates an address at which reading target pixel data is stored on the basis of any of the plurality of combinations of immediate values.

18. The image processing system according to claim 17, wherein the load/store unit reads a plurality of pieces of reading target pixel data at the same time on the basis of a plurality of the addresses calculated by the plurality of address calculation units.

19. The image processing system according to claim 12, wherein the control circuit controls the first two-dimensional address by moving the position of the read pointer in the order of raster scanning.

20. The image processing system according to claim 12, comprising a register configured to hold the width of the frame and the height of the frame.

* * * * *